United States Patent
Mikulec et al.

(10) Patent No.: US 8,761,994 B2
(45) Date of Patent: Jun. 24, 2014

(54) CONTROL UNIT, IN PARTICULAR FOR A HYBRID VEHICLE, HAVING AN ELECTRIC DRIVE AND AN INTERNAL COMBUSTION ENGINE, AND A METHOD FOR OPERATING A HYBRID VEHICLE

(75) Inventors: Dragan Mikulec, Erlangen (DE); Dieter Hanauer, Buedingen (DE); Andreas Heyl, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 1 day.

(21) Appl. No.: 13/264,655

(22) PCT Filed: Mar. 18, 2010

(86) PCT No.: PCT/EP2010/053497
§ 371 (c)(1),
(2), (4) Date: Jan. 18, 2012

(87) PCT Pub. No.: WO2010/130482
PCT Pub. Date: Nov. 18, 2010

(65) Prior Publication Data
US 2012/0109435 A1 May 3, 2012

(30) Foreign Application Priority Data
May 11, 2009 (DE) .......................... 10 2009 002 991

(51) Int. Cl.
*G01M 17/00* (2006.01)
(52) U.S. Cl.
USPC ........... 701/29.1; 701/22; 701/93; 180/62.25; 307/9.1
(58) Field of Classification Search
USPC ............. 701/22, 43, 84, 92, 93, 29.1; 290/40; 180/65.21, 65.275
See application file for complete search history.

(56) References Cited

U.S. PATENT DOCUMENTS

| | | | |
|---|---|---|---|
| 5,714,851 A * | 2/1998 | Antony et al. | 318/148 |
| 5,760,488 A | 6/1998 | Sonntag | |
| 7,471,003 B2 * | 12/2008 | Kobayashi et al. | 290/40 C |
| 7,607,293 B2 * | 10/2009 | Tamai et al. | 60/289 |
| 7,857,081 B2 * | 12/2010 | Kishimoto | 180/65.27 |
| 2007/0124037 A1 * | 5/2007 | Moran | 701/22 |
| 2008/0153660 A1 * | 6/2008 | Uejima et al. | 477/3 |
| 2008/0274856 A1 * | 11/2008 | Seel | 477/6 |
| 2009/0105038 A1 * | 4/2009 | Weiss et al. | 477/5 |

FOREIGN PATENT DOCUMENTS

| | | |
|---|---|---|
| DE | 19503749 | 4/1996 |
| DE | 19618897 | 11/1997 |
| DE | 102006032446 | 5/2007 |
| DE | 102007042724 | 3/2009 |
| WO | WO 2006131255 | 12/2006 |

OTHER PUBLICATIONS

International Search Report, PCT International Application No. PCT/EP2010/053497, dated Jul. 20, 2010.

* cited by examiner

*Primary Examiner* — Fadey Jabr
*Assistant Examiner* — Thomas Ingram
(74) *Attorney, Agent, or Firm* — Kenyon & Kenyon LLP

(57) ABSTRACT

A control unit for a hybrid vehicle is described, having an electric drive, and an internal combustion engine, and a method for operating a control unit, in particular for a hybrid vehicle. The hybrid vehicle has an electric drive, an internal combustion engine, a traction battery, a power electronics system, current consumers, a control unit and an insulation fault detector. The control unit initiates an emergency operating mode when an insulation fault is detected.

13 Claims, 1 Drawing Sheet

CONTROL UNIT, IN PARTICULAR FOR A HYBRID VEHICLE, HAVING AN ELECTRIC DRIVE AND AN INTERNAL COMBUSTION ENGINE, AND A METHOD FOR OPERATING A HYBRID VEHICLE

FIELD OF THE INVENTION

The present invention relates to a control unit, in particular for a hybrid vehicle, having an electric drive and an internal combustion engine, and a method for operating a hybrid vehicle.

BACKGROUND INFORMATION

In hybrid vehicles having an operating voltage which is higher than 60 V DC or 25 V AC, safety standards such as ISO 6469-3 require monitoring of the insulation resistance during operation if the traction network is set up electrically isolated from the 14-V electrical system of the hybrid vehicle.

In the presence of an electrical isolation, a single insulation fault does not yet pose any danger of an electric shock to the passengers. In this case, the safety standards ISO 6469-3 and SAE J 2344 therefore allow continued operation of the high voltage system of the vehicle, and thus the electric drive, with the condition that the insulation fault is signaled to the driver visually or acoustically, and that when the vehicle is shut off, a restart may occur only if forced. If a second insulation fault occurs, the safety standards require that the high voltage system of the vehicle is automatically shut down immediately. The insulation fault is ascertained by calculating the insulation resistance from the measured voltage values and the value of the load resistance, and by analyzing the calculated value with the aid of a microcomputer.

A circuit system for determining and displaying the insulation resistance of an accumulator battery is described in German Patent Application No. DE 196 18 897 B4. This determination of the insulation resistance is initialized by operating the ignition key of a motor vehicle and, moreover, also periodically during the driving operation of the motor vehicle. The insulation resistance is determined during isolated operation by measuring an open-circuit voltage and a load voltage. During the measuring process, a series circuit of two capacitors is connected to the terminals of the accumulator battery to store the voltage values obtained during the measurement. The joint point between the two capacitors is connected to a bleed resistor. Furthermore, a switching arrangement is provided, via which measuring amplifiers are connectable to the battery terminals with respect to ground for a predetermined period of time for measuring the partial voltage arising at the first capacitor and the partial voltage arising at the second capacitor. In addition, a switching arrangement is provided, via which the battery terminal having the higher partial voltage may be loaded with a load resistor for measuring the load voltage. Thus, the open-circuit voltage is measurable when the battery terminals are not loaded with a load resistor, and subsequently, the load voltage is measurable after the predefined setting time, when the selected battery terminal is loaded with the load resistor.

A vehicle having an electrical network supplied through fuel cells or batteries is described in German Patent Application No. DE 195 03 749 C1, which is designed as an IT network. Here, the consumers linked to the load current circuit are electrically connected to the car body in a low-resistance manner. Furthermore, an insulation monitoring system including a measuring bridge compensating stage and a measuring-signal-processing buffer amplifier stage is embedded in between the load current circuit and the car body. Furthermore, a control unit is provided, which triggers a pre-alert through a visual or an acoustic warning signal in the case of minor deviations of the insulation resistance from a first threshold value, and which in turn triggers a main alarm and initiates a shut-down of the system in the case of a major deviation.

SUMMARY

A control unit, in particular for a hybrid vehicle, in accordance with the present invention may have the advantage that the availability of the hybrid vehicle is increased without having to sacrifice safety. This is generally achieved by equipping the hybrid vehicle with an emergency operating mode which is initiated when an insulation fault is detected. In this emergency operating mode, an immediate start of the internal combustion engine is initiated, and a purely electric drive of the hybrid vehicle is prevented.

Preferably, a start-stop operation of the hybrid vehicle is also prevented, as well as regenerative braking of the hybrid vehicle. This has the advantage that after stopping at a traffic light, for example, the continuation of driving is reliably ensured, and, if the battery fails, no critical driving situations may occur.

According to an advantageous refinement of the present invention, the hybrid drive also has a speed limit to signal the problem which has arisen to the driver and to motivate him/her to locate a repair shop for repair purposes.

Further advantageous properties of the present invention are explained exemplarily based on the figures.

DETAILED DESCRIPTION OF EXAMPLE EMBODIMENTS

Figure 1:
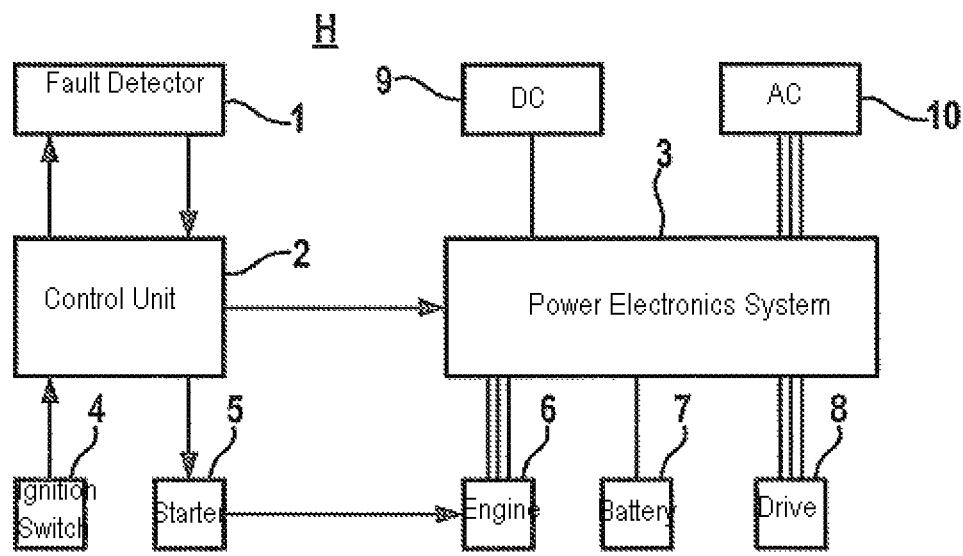
FIG. 1 shows a block diagram of a hybrid vehicle H, in which the components of the hybrid vehicle for understanding the present invention are illustrated.

Hybrid vehicle H, which is shown in FIG. 1, has an insulation fault detector 1, a control unit 2, a power electronics system 3, an ignition switch 4, a starter 5, an internal combustion engine 6, a traction battery 7, an electric drive 8, DC consumer 9, and AC consumer 10.

Power electronics system 3 includes the converters required for operating the hybrid vehicle, i.e., one or multiple DC converters, one or multiple pulse-controlled inverters and one or multiple rectifiers.

Insulation fault detector 1 is initialized by control unit 2 after ignition switch 4 has been triggered, and then measures the insulation resistance of traction battery 7. This measurement of the insulation resistance of traction battery 7 is repeated at predefined intervals during the operation of the vehicle. Each result signal ascertained in insulation fault detector 1 is supplied to control unit 2, where it is processed.

If the result signal provided by insulation fault detector 1 does not indicate an insulation fault, control unit 2 activates power electronics system 3 and starter 4 in such a way that hybrid vehicle H operates in normal operating mode.

In this normal operating mode, the direct voltage derived from traction battery 7, which is 300 V, for example, is converted into an alternating voltage in a pulse-controlled inverter of power electronics system 3, which supplies electric drive 8 of the hybrid vehicle. Electric drive 8 in turn supplies energy for operating DC consumer 9 and AC consumer 10 via power electronics system 3, the energy required by DC consumer 9 being obtained in power electronics system 3 with the aid of a DC converter. During this purely electric operation of hybrid vehicle H, internal combustion engine 6 is not activated.

If heavy loads occur while driving hybrid vehicle H, or if the charge level of traction battery 7 drops below a predefined threshold value, control unit 2 triggers starter 5, which starts internal combustion engine 6. The internal combustion engine then helps electric drive 8 to supply the current consumers of the hybrid vehicle.

In stationary phases of the hybrid vehicle, traction battery 7 may be recharged using energy derived from internal combustion engine 6.

In the normal mode of operation of the hybrid vehicle described above, all functions of the hybrid vehicle are available. These include a purely electric drive of the vehicle, a start-stop operation of the vehicle, a regenerative braking of the vehicle during which an energy recovery takes place, and an acceleration of the vehicle that has, at least for the most part, no speed limit.

If the result signal provided by insulation fault detector 1 indicates the presence of an insulation fault, control unit 2 initiates an emergency operating mode in which the hybrid vehicle continues to be available without having to sacrifice the safety of the hybrid vehicle.

In this emergency operating mode of the hybrid vehicle, control unit 2 ensures that an immediate start of internal combustion engine 6 is initiated, that the hybrid vehicle may not be operated in purely electric operating mode, that the hybrid vehicle may not be operated in start-stop operating mode, that the hybrid vehicle may not be operated in regenerative brake operating mode, and that, preferably, a speed limit is also activated.

By preventing the start-stop operation it is achieved, for example, that after stopping at a traffic light, it is ensured that the hybrid vehicle continues driving. By preventing regenerative braking it is ensured that in the case of a failure of the traction battery, no critical driving situations may arise. As a result of the potential speed limit, the presence of an insulation fault is brought to the attention of the driver, so that he/she is motivated to find a repair shop where the existing insulation fault may be eliminated. This accounts for the circumstance that in the related art, many drivers still do not see the necessity of having the vehicle repaired when a first insulation fault exists, in spite of having been made aware of this insulation fault visually and/or acoustically. The presence of a speed limit significantly reduces the acceleration of the vehicle and consequently the driving pleasure, so that the driver is more inclined to have the vehicle repaired than is the case in the related art.

Figure 2:
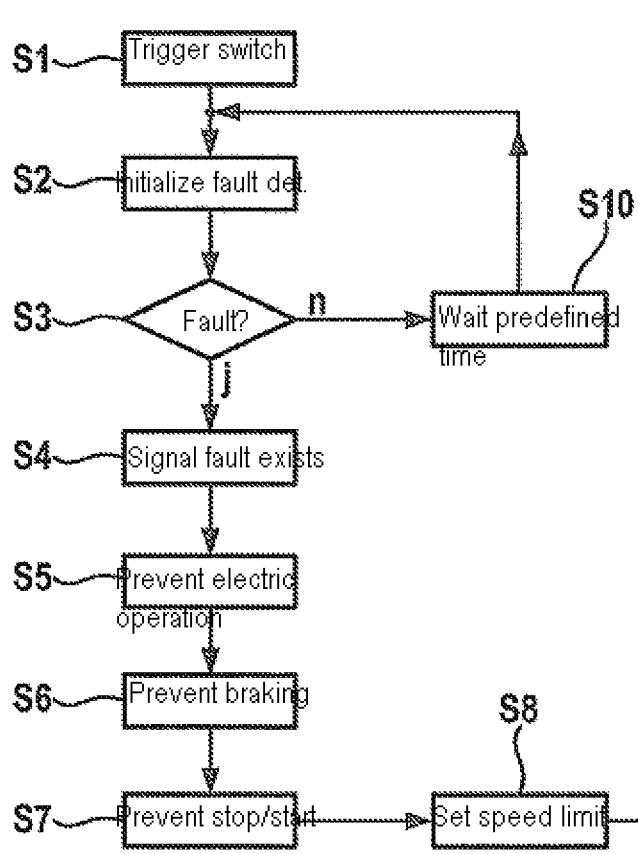
FIG. 2 shows a flow chart to explain the mode of operation of control unit 2 shown in FIG. 1.

FIG. 2 shows a flow chart to explain the operating mode of control unit 2 shown in FIG. 1, which may be used in a hybrid vehicle, in particular.

In step S1, ignition switch 4 of the hybrid vehicle is triggered. Thereupon, control unit 2 initializes insulation fault detector 1 in step S2, so that it measures the insulation resistance of traction battery 7, and outputs the result signals thus obtained to control unit 2.

In step S3, a query takes place in control unit 2 as to whether or not an insulation fault exists. If no insulation fault exists, step S10 follows, according to which a predefined period of time is awaited until a return to step S2 takes place, to once again initialize the insulation fault detector to measure the insulation resistance. If, however, it is established in step S3 that an insulation fault exists, step S4 follows.

In step S4, internal combustion engine 6 is started by starter 5 and it is signaled visually or acoustically that an insulation fault exists. In step S5, purely electric operation of the hybrid vehicle is prevented. In step S6, regenerative braking is prevented, in step S7, start-stop operation of the hybrid vehicle is prevented, and in step S8, a speed limit of the hybrid vehicle is initiated, where, for example, the speed of all forward gears of the hybrid vehicle is limited to an average speed value. In step 9, the method is concluded.

Steps S4 through S8 correspond to an initiation of an emergency operating mode which is initiated after the detection of the presence of an insulation fault. The sequence rapid sequence anyway, is interchangeable. Step S8 is an optional step.

This emergency operating mode is initiated as soon as the presence of the first insulation fault is detected. By using this strategy, the availability of the vehicle is increased without reducing its safety.

Conventionally, where after the occurrence of a first insulation fault unlimited operation of the vehicle is still possible, the vehicle might, in contrast to that, break down, when a second insulation fault occurs during purely electric operation, if the required reaction time between recognizing the insulation fault and shutting off the high voltage system is insufficient for starting the internal combustion engine, or if the second insulation fault occurs on another voltage side than the first insulation fault. In this case, the high voltage system and the electric drive have short-circuited, so that no torque may be built up.

If in the related art the hybrid vehicle is in the operating mode of regenerative braking when the second insulation fault occurs, a momentary loss of deceleration due to a discontinuation of the braking torque of the electric drive may occur, resulting in driving instabilities.

None of the disadvantages described above occur if an emergency operating mode having the properties according to the example embodiment of the present invention is initiated after a first insulation fault has occurred.

What is claimed is:

1. A control unit for a hybrid vehicle, the hybrid vehicle having an electric drive, an internal combustion engine, a traction battery, a power electronics system, current consumers, a control unit and an insulation fault detector;
   wherein the control unit is configured to, in response to detecting an occurrence of an insulation fault, initiate an emergency operating mode in which the internal combustion engine is always activated by initiating a starting of the internal combustion engine, and
   while in the emergency operating mode, the control unit prevents a purely electric driving operation of the hybrid vehicle, wherein in the purely electric driving operation the vehicle is powered using only the electric drive, without activating the internal combustion engine.

2. The control unit as recited in claim 1, wherein the control unit is configured to prevent regenerative braking while in the emergency operating mode.

3. The control unit as recited in claim 1, wherein the control unit is configured to prevent a start-stop operation of the hybrid vehicle while in the emergency operating mode.

4. The control unit as recited in claim 1, wherein the control unit is configured to initiate a speed limit while in the emergency operating mode.

5. The control unit as recited in claim 1, wherein the insulation fault involves the traction battery.

6. The control unit as recited in claim 1, wherein the control unit is configured to, while in the emergency operating mode:
- prevent regenerative braking;
- prevent a start-stop operation of the hybrid vehicle; and
- impose a speed limit.

7. A method for operating a control unit for a hybrid vehicle having an electric drive and an internal combustion engine, the method comprising:
- Initializing, by the control unit, an insulation fault detector;
- Checking, by the control unit, if an insulation fault exists; and
- in response to detecting an occurrence of an insulation fault, initiating, by the control unit, an emergency operating mode in which the internal combustion engine is always activated, by initiating a starting of the internal combustion engine; and
- while in the emergency operating mode, preventing a purely electric driving operation of the hybrid vehicle, wherein in the purely electric driving operation the vehicle is powered using only the electric drive, without activating the internal combustion engine.

8. The method for operating a control unit as recited in claim 7, wherein as part of the emergency operating mode, regenerative braking of the hybrid vehicle is prevented.

9. The method for operating a control unit as recited in claim 7, wherein as part of the emergency operating mode, a start-stop operation of the hybrid vehicle is prevented.

10. The method for operating a control unit as recited claim 7, wherein as part of the emergency operating mode, a speed limit is initiated.

11. The method as recited in claim 7, wherein the insulation fault involves a traction battery.

12. The method as recited in claim 7, further comprising performing the following while in the emergency operating mode:
- preventing regenerative braking;
- preventing a start-stop operation of the hybrid vehicle; and
- imposing a speed limit.

13. A hybrid vehicle comprising:
- an electric drive;
- an internal combustion engine;
- a traction battery;
- a power electronics system,
- current consumers,
- a control unit and
- an insulation fault detector;
- wherein the control unit is configured to, in response to detecting an occurrence of an insulation fault, initiate an emergency operating mode, in which the internal combustion engine is always activated, by initiating a starting of the internal combustion engine, and
- while in the emergency operating mode, the control unit prevents a purely electric driving operation of the hybrid vehicle, wherein in the purely electric driving operation the vehicle is powered using only the electric drive, without activating the internal combustion engine.

* * * * *